(12) United States Patent
Han et al.

(10) Patent No.: US 12,728,781 B2
(45) Date of Patent: Sep. 8, 2026

(54) OPEN SPACE TYPE HEADREST FOR SEAT

(71) Applicants: Hyundai Motor Company, Seoul (KR); Kia Corporation, Seoul (KR); Hyundai Ind. Co., Ltd., Ulsan (KR)

(72) Inventors: Jong-Seok Han, Suwon (KR); Sang-Do Park, Suwon (KR); Deok-Soo Lim, Hwaseong (KR); Sang-Soo Lee, Hwaseong (KR); Sang-Hark Lee, Incheon (KR); Chan-Ho Jung, Gunpo (KR); Suk-Won Hong, Bucheon (KR); Hyun-Suk Kang, Ulsan (KR); Sang-Sub Jeon, Asan (KR); Sung-Chol An, Hwaseong (KR); Min-Soo Kim, Ulsan (KR)

(73) Assignees: Hyundai Motor Company, Seoul (KR); Kia Corporation, Seoul (KR); Hyundai Ind. Co., Ltd., Ulsan (KR)

( * ) Notice: Subject to any disclaimer, the term of this patent is extended or adjusted under 35 U.S.C. 154(b) by 297 days.

(21) Appl. No.: 18/516,229

(22) Filed: Nov. 21, 2023

(65) Prior Publication Data

US 2024/0262272 A1 Aug. 8, 2024

(30) Foreign Application Priority Data

Feb. 8, 2023 (KR) ........................ 10-2023-0016715

(51) Int. Cl.
*B60N 2/865* (2018.01)
*B60N 2/80* (2018.01)

(52) U.S. Cl.
CPC ........ *B60N 2/865* (2018.02); *B60N 2002/899* (2018.02)

(58) Field of Classification Search
CPC .... B60N 2/865; B60N 2/80; B60N 2002/899; A61G 15/125
USPC .................................................. 297/391–410
See application file for complete search history.

(56) References Cited

U.S. PATENT DOCUMENTS 3,172,702 A * 3/1965 Rose ...................... B60N 2/882 297/216.12
3,645,556 A * 2/1972 Kobori .................. B60N 2/803 297/216.12
3,713,695 A * 1/1973 Von Wimmersperg ...................... B60N 2/2884 297/216.12
3,865,450 A * 2/1975 Bruenig ................ B60N 2/803 297/397
4,190,289 A * 2/1980 Brunig .................... B60N 2/80 297/391

(Continued)

FOREIGN PATENT DOCUMENTS

CN 210258132 U 4/2020
JP 2013-126820 A 6/2013

(Continued)

*Primary Examiner* — Jose V Chen
(74) *Attorney, Agent, or Firm* — Fox Rothschild LLP

(57) ABSTRACT

An open space type headrest is applied to a vehicle seat in which a covering, which surrounds a foam pad of a volume body positioned on a mounting cover of a flat body coupled to a front surface of an exterior cover formed of a protrusion body, is fixed to the mounting cover, and opening spaces are formed in the exterior cover, the mounting cover, and the foam pad to enlarge front viewing of a rear passenger due to a see-through characteristic of a mesh fabric of the covering.

19 Claims, 3 Drawing Sheets

(56) References Cited

U.S. PATENT DOCUMENTS 7,303,232 B1 * 12/2007 Chen ........................ A47C 7/38 297/284.7
8,708,406 B1 * 4/2014 Powell ..................... A47C 7/62 5/725
10,973,722 B1 * 4/2021 Nsien ....................... A63B 7/00
11,110,835 B2 9/2021 Pierce
11,696,645 B1 * 7/2023 Wu .......................... A47C 7/38 297/391
2004/0189061 A1 9/2004 Hartwich et al.
2006/0279115 A1 * 12/2006 Tisdelle ................... B60N 2/80 297/216.12
2007/0246979 A1 * 10/2007 Browne ................. B60N 2/806 297/216.12
2007/0257537 A1 * 11/2007 Asbury .................... A47C 7/38 297/391
2008/0157580 A1 * 7/2008 Lin ..................... A47C 31/023 297/391
2011/0101761 A1 * 5/2011 Demaras ................ B60N 2/882 297/393
2011/0204694 A1 * 8/2011 Igarashi ................... A47C 7/46 297/396
2015/0072107 A1 * 3/2015 Fujita ...................... B32B 5/026 442/221
2015/0283927 A1 * 10/2015 Velasco .................. B60N 2/803 297/391
2017/0197528 A1 7/2017 Navarro et al.
2017/0320418 A1 * 11/2017 Madrigal ................. B60N 2/80
2018/0154813 A1 * 6/2018 Kober .................... B60N 2/865
2020/0180483 A1 * 6/2020 Kober .................... B60N 2/809
2023/0115359 A1 * 4/2023 Pierce ...................... B60N 2/80 297/220

FOREIGN PATENT DOCUMENTS

KR 10-0168948 2/1999
KR 10-1764770 B1 8/2017

* cited by examiner

<SECT. A-A>

<SIDE VIEW>

OPEN SPACE TYPE HEADREST FOR SEAT

CROSS-REFERENCE TO RELATED APPLICATION

This application claims under 35 U.S.C. § 119(a) the benefit of Korean Patent Application No. 10-2023-0016715, filed on Feb. 8, 2023, the entire contents of which are incorporated herein by reference.

BACKGROUND

(a) Technical Field

The present disclosure relates to a headrest for a vehicle seat, more particularly, to an open space type headrest which includes a space opening structure using a see-through characteristic of a mesh fabric in order to enhance front viewing by a rear passenger positioned behind the vehicle seat.

(b) Description of the Related Art

Generally, a headrest is a component of a vehicle seat applied for the purpose of reducing neck injury of a passenger in a vehicle in the event of a rear collision, where the headrest should be able to absorb an impact while maintaining rigidity.

To this end, the headrest is formed in a structure in which a blower, which is an injection molded product, and a foam pad, which is a foam molded product of urethane, are surrounded by a covering fabric. The headrest is assembled in a structure in which a mounting frame (or a post) coupled to the blower is detached from and attached to a back of the vehicle seat.

In particular, the blower maintains a shape of the headrest, the foam pad provides a cushion for supporting the neck of the passenger, and the covering fabric has a three-dimensional shape along a contour of the headrest by sewing a fabric into a desired shape.

Therefore, the headrest is a closed space type headrest in which the shape of the headrest typically blocks front viewing of a rear passenger.

However, since the closed space type headrest has a closed headrest shape, there is a disadvantage in reducing or obstructing the front viewing of the rear passenger as much as a size of the headrest in a state of being installed in the seat.

In addition, in the closed space type headrest, since an inner space of the covering fabric is entirely filled with the blower and the foam pad, an internal structure is narrow so that, even when a cushioning action of the foam pad is present, a physical property of the headrest is inevitably hard.

The closed shape and the narrow internal structure of the closed space type headrest lower a degree of freedom in headrest design so that it is difficult or impossible to manufacture the headrest with various structures and shapes.

SUMMARY

An embodiment of the present disclosure is directed to providing an open space type headrest for a vehicle seat, which has a space opening structure using a see-through characteristic of a mesh fabric to enlarge front viewing, i.e., an enlarged forward-facing field of view, by a rear passenger. Such an arrangement of the headrest may enhance an open feeling of a rear passenger, and is capable of promoting a compact design and increasing a degree of design freedom, and particularly, may provide a comfort feeling due to elasticity of a fabric while maintaining rigidity and impact absorption performance by adjusting mesh fabric tension (a static load) in an inside of the headrest through a length of a string.

As provided herein, the term "see-through characteristic" refers to the subjective ability of a person to see objects located forward of a "see-through" material. As provided herein, a "see-through" characteristic is obtained by using a mesh fabric, e.g., which refers to spaces between a yarn, e.g., of the fabric, where mesh fabrics may be woven, knit, lace, net, crocheted, etc. Mesh fabrics include nylon, polyester, and many other types of natural and synthetic fabrics. In addition, the term "see-through characteristic" may refer to light transparency, which is measured by a material's total transmittance. Total transmittance is the ratio of transmitted light to the incident light as influenced by reflection and absorption. For example, the following equation provides an explanation: Incident light=100%−(Absorption+Reflection) =Total Transmittance. Certain materials have physical properties that allow light to pass through without substantial scattering of light. The exact amount of light that can pass through depends on the material. Other materials that are not considered transparent may be considered translucent, which lets light pass through but objects on the other side cannot be seen clearly. Light transmission percentages over 85% may be considered "transparent." In addition, thickness of a material may affect perceived transparency or optical clarity, such that it will decrease with increasing thickness. Optical clarity is also dependent on surface reflections, which may create significant transmission losses.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a headrest including an exterior cover formed of a protrusion body, a mounting cover formed of a flat body and positioned on a front surface of the exterior cover, a foam pad formed of a volume body and positioned on a front surface of the mounting cover, a covering made of a mesh fabric having a see-through characteristic and configured to surround the foam pad, a string configured to fix an outer line of the mesh fabric of the covering and fixed to the mounting cover, and a post frame positioned between the exterior cover and the mounting cover, wherein the exterior cover, the mounting cover, and the foam pad form an opening space through openings.

As an exemplary embodiment, the opening space may be formed in a left-right symmetrical structure inside a rim surrounding the protrusion body, the flat body, and the volume body, and any one shape among an elliptical shape, a circular shape, a quadrangular shape, or a triangular shape may be applied to the opening space.

As an exemplary embodiment, the exterior cover may form a rear protrusion as the protrusion body, and the rear protrusion may accommodate a mechanical component of the post frame in an internal space.

As an exemplary embodiment, the mounting cover may be provided with a plurality of hooks on an edge of the flat body, and a protruding structure having an internal space into which the string is inserted may be applied to at least one of the hooks so that the string may be hooked and fixed to the at least one of the hooks.

As an exemplary embodiment, the exterior cover and the mounting cover may be injection molded frames, and the foam pad may be a foam molded product.

As an exemplary embodiment, tension (a static load) of the covering may be controlled by a length of the string due to elasticity of the mesh fabric.

As an exemplary embodiment, the post frame may include a post configured to be detached from or attached to a backrest of the seat, and a mechanical component which forms a rear inclination at an upper end of the post, and the mechanical component may be positioned inside the protrusion body of the exterior cover in a state of being coupled to the mounting cover.

In accordance with another embodiment of the present disclosure, a seat for a vehicle includes: a headrest including an exterior cover formed of a protrusion body, a mounting cover formed of a flat body and positioned on a front surface of the exterior cover, a foam pad formed of a volume body and positioned on a front surface of the mounting cover, and a covering surrounding the foam pad of the volume body, the covering being made of a mesh fabric having a see-through characteristic and configured to surround the headrest; and a post frame positioned between the exterior cover and the mounting cover and configured to detach or attach the headrest from or on top of a backrest.

In accordance with another embodiment of the present disclosure, there is provided a seat including: a headrest in which a covering surrounding a foam pad of a volume body positioned on a mounting cover of a flat body coupled to a front surface of an exterior cover formed of a protrusion body is fixed to a mounting cover by the medium of a string, and opening spaces formed in the exterior cover, the mounting cover, and the foam pad enlarge front viewing of a rear passenger due to a see-through characteristic of a mesh fabric of a covering; and a post frame positioned between the exterior cover and the mounting cover and configured to detach or attach the headrest from or on the top of the backrest.

As an exemplary embodiment, the headrest may form a front viewing extension of the rear passenger through the opening spaces.

As an exemplary embodiment, the post frame may include a post configured to detach or attach the headrest from or to the top of the backrest, and a mechanical component provided with a mechanism configured to implement forward and backward sliding of the headrest.

As an exemplary embodiment, a vehicle and/or a vehicle seat may include the above-described headrest.

DETAILED DESCRIPTION

Figure 1:
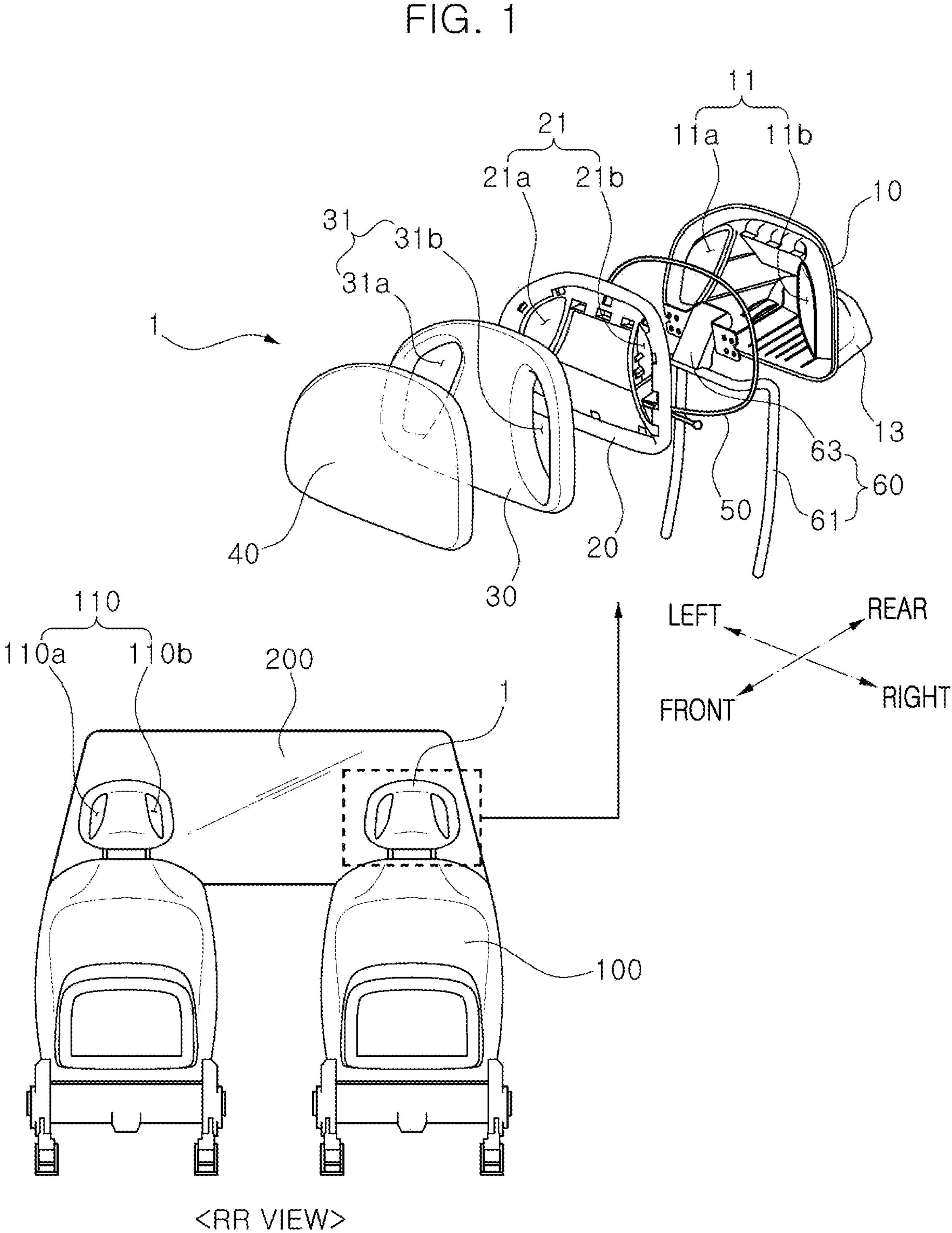
FIG. 1 is a configuration diagram illustrating a seat to which an open space type headrest according to the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure will be described below in more detail with reference to the accompanying drawings, and these embodiments are examples of the present disclosure and may be embodied in various other different forms by those skilled in the art to which the present disclosure pertains so that the present disclosure is not limited to these embodiments.

Referring to FIG. 1, in a headrest 1 mounted on top of a backrest of a seat 100, the headrest 1 is surrounded by a covering 40 having a see-through characteristic, and thus openings 11, 21, and 31 are formed on a left side and a right side of the headrest 1, and the openings 11, 21, and 31 may enlarge a forward viewing space (i.e., a field of view) of a rear passenger positioned behind the seat 100.

Therefore, unlike the conventional closed space type headrest 1, the headrest 1 is characterized as an open space type headrest 1.

Thus, the seat 100 forms a front viewing extension 110 due to the open space type headrest 1, and the front viewing extension 110 is divided into a left front viewing space 110*a* passing through a left side of the open space type headrest 1 and a right front viewing space 110*b* passing through a right side of the open space type headrest 1.

Therefore, in the seat 100, a field of view of the rear passenger facing a vehicle front window 200 may enlarge the left/right front viewing spaces 110*a* and 110*b* by left/right opening spaces 11*a*, 11*b*, 21*a*, 21*b*, 31*a*, and 31*b* of the headrest 1.

To this end, in the headrest 1, the left/right opening spaces 11*a* and 11*b* of the opening 11 passing through an exterior cover 10 are formed for the left/right front viewing spaces 110*a* and 110*b* of the seat 100.

Specifically, the open space type headrest 1 includes the exterior cover 10, a mounting cover 20, a foam pad 30, the covering 40, a string 50, and a post frame 60. In this case, the exterior cover 10 and the mounting cover 20 are injection frames manufactured by injection molding, and the foam pad 30 is a foam molded product obtained by foaming a foaming agent such as urethane.

As one example, the exterior cover 10 is formed as a protrusion body forming the opening 11 and a rear protrusion 13, the opening 11 is formed as the left opening space 11*a* and the right opening space 11*b* of a left/right symmetrical structure passing through the protrusion body based on a middle portion of the protrusion body (i.e., the rear protrusion 13). Thus, the left opening space 11*a* and the right opening space 11*b* are formed as the left front viewing space 110*a* and the right front viewing space 110*b* of the seat 100.

In particular, since the protrusion body forms an approximately "U"-shaped internal space (see FIG. 3) in a front-rear direction of the headrest, unlike the closed space type headrest of the existing structure in which an inner space is entirely filled with a blower, an empty space may be formed and contributes to softening a physical property of the headrest together with a cushioning action of the foam pad 30.

As one example, the mounting cover 20 is formed as a flat body forming the opening 21, the opening 21 is formed as the left opening space 21*a* and the right opening space 21*b* of a left/right symmetrical structure passing through the flat body based on a middle portion of the flat body. Thus, the left opening space 21*a* and the right opening space 21*b* are formed as the left front viewing space 110*a* and the right front viewing space 110*b* of the seat 100.

In particular, the exterior cover 10 and the mounting cover 20 are assembled by aligning an edge of the protrusion body with an edge of the flat body.

Therefore, the exterior cover 10 and the mounting cover 20 fix the foam pad 30 and the covering 40 while forming an exterior shape.

As one example, the foam pad 30 is formed as a volume body forming the opening 31, the opening 31 is formed as the left opening space 31*a* and the right opening space 31*b* of a left/right symmetrical structure passing through the volume body based on a middle portion of the volume body. Thus, the left opening space 31*a* and the right opening space 31*b* are formed as the left front viewing space 110*a* and the right front viewing space 110*b* of the seat 100.

In particular, the foam pad 30 absorbs an impact in the event of a rear collision.

Therefore, the left/right opening spaces 11*a*, 11*b*, 21*a*, 21*b*, 31*a*, and, 31*b* of the exterior cover 10, the mounting cover 20, and the foam pad 30 are formed in a left-right symmetrical structure inside a rim surrounding the protrusion body of the exterior cover 10, the flat body of the mounting cover 20, and the volume body of the foam pad 30. In addition, the left/right opening spaces 11*a*, 11*b*, 21*a*, 21*b*, 31*a*, and, 31*b* are each exemplified as an elliptical shape, but various shapes such as circle shapes, quadrangular shapes, and triangular shapes may be applied thereto.

As an example, the covering 40 is a mesh fabric having a see-through characteristic and is a head contact portion with a soft material in which elasticity of the mesh fabric is adjusted by the string 50 fixed to the mounting cover 20 in a state of surrounding the foam pad 30. In this case, the elasticity adjustment of the mesh fabric means adjustment of tension (i.e., static load) of the mesh fabric.

Therefore, the covering 40 provides a seating feeling and a comfort feeling by implementing softness of the headrest due to an elastic force of the mesh fabric made of a soft material. In particular, the covering 40 uses the see-through characteristic of the mesh fabric to improve front viewing extension and an open feeling of the rear passenger.

As one example, the string 50 is a fixing wire and fixes an outer line of the mesh fabric of the covering 40 overlaid on the foam pad 30 using the mounting cover 20. In particular, the string 50 adjusts tension (i.e., a static load) of the mesh fabric using a length thereof.

As one example, the post frame 60 includes a post 61 having a forward bent structure for detaching or mounting the open space type headrest 1 from or on the top of the backrest of the seat 100, and a mechanical component 63 provided with various mechanisms for headrest movement and welded to an upper portion of the post 61. In this case, the post 61 is made of a steel material to maintain strength of the headrest, and a mechanism of the mechanical component 63 is the same as the general headrest mechanism and thus operates to enable front/rear sliding which is the basic function of the headrest.

In particular, the mechanical component 63 forms an acute rear inclination at an upper end of the post 61.

In addition, the post frame 60 forms left and right brackets at the mechanical component 63, and a plurality of holes are formed in the left and right brackets and are coupled to a plurality of protruding pins protruding from the flat body of the mounting cover 20 to form an assembled state.

Therefore, the post frame 60 is located in the internal space of the rear protrusion 13 where the mechanical component of the mechanism forms the exterior cover 10 as the protrusion body between the exterior cover 10 and the mounting cover 20.

Figure 2:
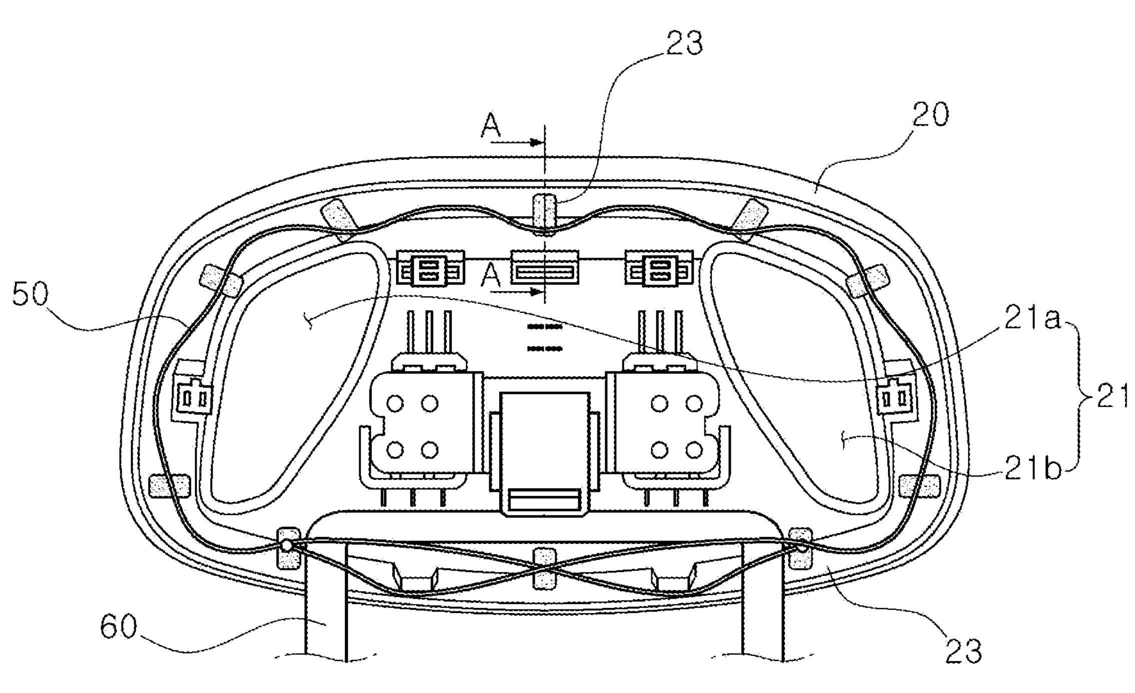
FIG. 2 is a diagram illustrating a fixed state of a mesh fabric which is a covering according to the present disclosure.
Figure 2:
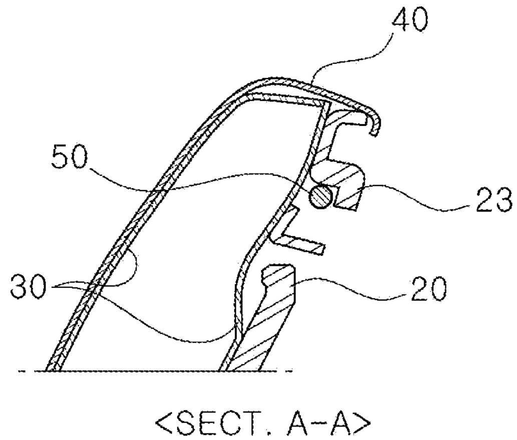

Meanwhile, FIG. 2 illustrates that the covering 40 is fixed to an edge of the mounting cover 20 by the string 50.

As shown in FIG. 2, a plurality of hooks 23 are formed on the edge of the mounting cover 20 with a predetermined interval from each other, where an exemplary structure of a hook 23 is shown in the accompanying sectional view.

In particular, as shown in section A-A, the hook 23 has a protruding structure with an internal space in which a bent portion is formed at one side of an inlet and is restricted by the bent portion even when the string 50 is moved toward the inlet in a state of being inserted into the internal space of the hook 23. Thus, the bent portion prevents the string 50 from being separated from the hook 23.

Therefore, the string 50 is fixed to be hung on the plurality of hooks 23 formed along the edge of the mounting cover 20 in a state of fixing the outer line of the mesh fabric of the covering 40 so that the covering 40 is fixed to the mounting cover 20 in a state of surrounding the foam pad 30.

In particular, during a knot operation for fixation in a state of being hung on the hooks 23 of the mounting cover 20, since the length of the string 50 is adjusted by both ends of the string 50, which are tied in a knot, the tension of the mesh fabric (i.e. the static load) may be adjusted. This is because the string 50 is in a state of fixing the outer line of the mesh fabric, so the more the both ends of the string are pulled, the more the mesh fabric may be contracted.

Figure 3:
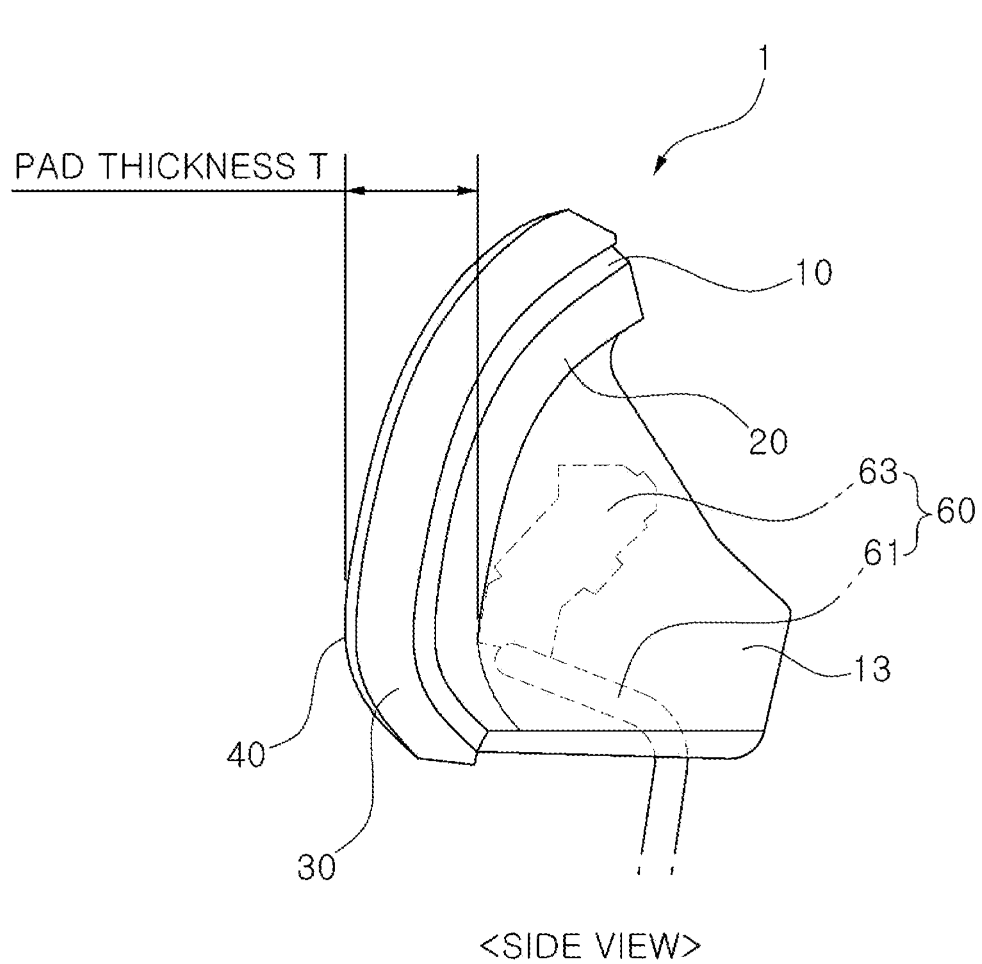
FIG. 3 is a diagram illustrating a side surface of the open space type headrest according to the present disclosure.

Meanwhile, referring to FIG. 3, in the open space type headrest 1, a front space of the mounting cover 20 is entirely filled with a pad thickness T of the foam pad 30 so that more impact absorption performance may be provided in the event of a rear collision.

As the mechanical component 63, in which the post frame 60 forms the acute rear inclination at the upper end of the post 61, is positioned in the internal space formed by the rear protrusion 13 of the exterior cover 10 (i.e., the internal space of the protrusion body), such an increase of the pad thickness T results from the exterior cover 10 pushed toward a rear side compared to the existing front occupied structure.

As described above, in the open space type headrest 1 applied to the seat 100 according to the present embodiment, the covering 40 surrounding the foam pad 30 of the volume body positioned on the mounting cover 20 of the flat body coupled to a front surface of the exterior cover 10 formed of the protrusion body is fixed to the mounting cover 20 by the medium of the string 50, and the opening spaces 11*a*, 11*b*, 21*a*, 21*b*, 31*a*, and 31*b* formed in the exterior cover 10, the mounting cover 20, and the foam pad 30 enlarge the front viewing of the rear passenger due to the see-through characteristic of the mesh fabric of the covering 40. Therefore, the space opening structure using the see-through characteristic of the mesh fabric enlarges the front viewing and the open feeling of the rear passenger and an increase in slimness and the degree of design freedom is possible. In particular, the rigidity and the impact absorption performance are maintained by adjusting the mesh fabric tension (the static load) in the inside of the headrest through a length of a string, and the comfort feeling is also provided by the seating feeling of the elasticity of the fabric.

In accordance with an open space type headrest applied to a seat of the present disclosure, when compared to the conventional headrest of a foam pad and covering surrounding type, by applying a mesh fabric, it is possible to provide an advantage capable of increasing an open feeing of a rear passenger using a mesh fabric characteristic, improving a comfort feeling using elasticity of the mesh fabric, reducing neck damage through adjusting the elasticity of the mesh fabric and a thickness of the foam pad, and easily improving comfort performance.

Consequently, the open space type headrest can increase a degree of design freedom and implement slimness with a mesh fabric material applicable structure so that it possible to manufacture a headrest with various structures and shapes while satisfying a function and performance of the conventional headrest.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A headrest for a vehicle seat, comprising:
a mounting cover;
a foam pad positioned on a front surface of the mounting cover; and
a covering made of a mesh fabric having a see-through characteristic and configured to surround the foam pad,
wherein the mounting cover and the foam pad each include openings that define an opening space extending through the headrest.

2. The headrest of claim 1, further comprising:
an exterior cover including an opening that is aligned with the openings of the mounting cover and the foam pad;
the mounting cover being formed of a flat body and positioned on a front surface of the exterior cover; and
the foam pad being formed of a volume body,
wherein the exterior cover, the mounting cover, and the foam pad form the opening space through the openings of the mounting cover, the foam pad, and the exterior cover.

3. The headrest of claim 2, wherein the opening space is formed in a left-right symmetrical structure inside a rim surrounding the protrusion body, the flat body, and the volume body.

4. The headrest of claim 2, wherein the opening space has any one shape among an elliptical shape, a circular shape, a quadrangular shape, or a triangular shape.

5. The headrest of claim 2, wherein the exterior cover and the mounting cover are injection molded frames.

6. The headrest of claim 2, wherein the foam pad is a foam molded product.

7. The headrest of claim 2, further comprising:
a string configured to fix an outer line of the mesh fabric of the covering and fixed to the mounting cover; and
a post frame positioned between the exterior cover and the mounting cover.

8. The headrest of claim 7, wherein:
the exterior cover forms a rear protrusion as the protrusion body; and
the rear protrusion accommodates a mechanical component of the post frame in an internal space.

9. The headrest of claim 7, wherein:
the mounting cover is provided with a plurality of hooks on an edge of the flat body; and
the string is hung on and fixed to at least one of the hooks.

10. The headrest of claim 9, wherein the at least one of the hooks is a protruding structure having an internal space into which the string is inserted.

11. The headrest of claim 7, wherein tension of the covering is controlled by a length of the string due to elasticity of the mesh fabric.

12. The headrest of claim 7, wherein the post frame includes:
a post configured to be detached from or attached to a backrest of the seat; and
a mechanical component which forms a rear inclination at an upper end of the post.

13. The headrest of claim 12, wherein the mechanical component is positioned inside the protrusion body of the exterior cover in a state of being coupled to the mounting cover.

14. A vehicle seat comprising the headrest of claim 1.

15. A vehicle comprising the headrest of claim 1.

16. A seat for a vehicle, comprising:
a headrest comprising:
an exterior cover;
a mounting cover formed of a flat body and positioned on a front surface of the exterior cover;
a foam pad formed of a volume body and positioned on a front surface of the mounting cover; and
a covering surrounding the foam pad of the volume body, the covering being made of a mesh fabric having a see-through characteristic; and a post frame positioned between the exterior cover and the mounting cover and configured to detach or attach the headrest from or on top of a backrest.

17. The seat of claim 16, wherein the headrest forms a front viewing extension of a rear passenger through an opening space defined by openings of the mounting cover, the foam pad, and the exterior cover.

18. The seat of claim 16, wherein the post frame includes:

a post configured to detach or attach the headrest from or to the top of the backrest; and a mechanical component provided with a mechanism configured to implement forward and backward sliding of the headrest.

19. A vehicle comprising the seat of claim 16.

* * * * *